United States Patent [19]
Reid

[11] Patent Number: 5,455,180
[45] Date of Patent: Oct. 3, 1995

[54] CONTAINER CLOSURE OF MEDICAL TESTS

[75] Inventor: Grahame W. Reid, Novato, Calif.

[73] Assignee: Innovative Molding, Inc., Sebastopol, Calif.

[21] Appl. No.: 217,458

[22] Filed: Mar. 24, 1994

[51] Int. Cl.[6] .................. B29C 43/02; B65D 41/08; C12M 1/16; C12M 1/24
[52] U.S. Cl. .................. 435/288.1; 215/247; 215/276; 215/350; 264/320
[58] Field of Search .................. 264/320; 215/247, 215/276, 350; 435/296, 299

[56] References Cited

U.S. PATENT DOCUMENTS

| | | | |
|---|---|---|---|
| 1,942,810 | 1/1934 | Gibbs | 215/276 |
| 3,339,772 | 9/1967 | Miller | 215/277 |
| 3,499,568 | 3/1970 | Riera | 215/276 |
| 3,589,983 | 6/1971 | Holderith et al. | 435/296 |
| 3,612,325 | 10/1971 | Williams | 215/350 |
| 3,736,899 | 6/1973 | Manske | 215/37 |
| 3,831,796 | 8/1974 | Claasen | 215/9 |
| 3,946,891 | 3/1976 | Picoy et al. | 215/256 |
| 4,493,427 | 1/1985 | Wolkonsky | 215/230 |
| 4,605,135 | 8/1986 | Ryder | 215/220 |
| 4,664,276 | 5/1987 | Taragna et al. | 215/249 |
| 4,809,858 | 3/1989 | Ochs | 215/276 |
| 4,812,408 | 3/1989 | Hammann et al. | 435/299 |
| 4,830,970 | 5/1989 | Madaus et al. | 435/299 |
| 4,948,000 | 8/1990 | Grabenkort | 215/12.2 |
| 5,080,245 | 1/1992 | Conard | 215/249 |
| 5,269,429 | 12/1993 | Schumacher | 215/249 |

FOREIGN PATENT DOCUMENTS 2444081  8/1980  France ................. 435/296

*Primary Examiner*—Jeffrey C. Russel
*Attorney, Agent, or Firm*—Thomas M. Freiburger

[57] ABSTRACT

A closure for a medical specimen test jar includes a threaded closure ring and a separate, connected but freely rotatable sealing gasket on the underside of the ring. An agar paddle is secured to the closure via the gasket at the inside of the closure ring, the gasket material being relatively rigid, and the connection with the agar paddle being such as to retain the agar paddle securely. A matrix of posts is included on each side of the agar paddle, and in the production of the paddle the posts and a perimeter rim around each side of the agar paddle are staked down by heat and pressure to form overhanging flanges on the posts and an undercut rim which serve to retain the flexible agar mass in place on the test paddle. At the center of the closure is a needle-penetrable septum for receiving injection of blood or other specimens. The closure retains a vacuum in the medical specimen jar and still allows removal of the closure without requiring excessive twisting force, by use of the two-piece assembly, which eliminates the need to overcome static friction of the gasket on the container finish while unscrewing the closure ring.

25 Claims, 3 Drawing Sheets

5,455,180

CONTAINER CLOSURE OF MEDICAL TESTS

BACKGROUND OF THE INVENTION

The invention is concerned with container closures generally, and in a specific embodiment the invention relates to a medical test jar, sealed with an agar inside and with provision for injection of blood or other serum for testing the serum. The invention is particularly concerned with a sealing closure for such a test jar, the test jar and closure being of all plastic construction, of a conveniently large size, capable of sustaining a vacuum and the closure being easily removable by laboratory personnel.

Medical test jars for the general purpose stated above are known. The jars themselves have typically been very small, on the order of test-tube size, with an agar-holding paddle extending down into the container. The jars have typically been inconveniently small in size and have required handling of the paddle by the technician to conduct testing operations. In these tests the moldable, gelatin-like agar on the paddle generally holds a culture medium to be used in a test of the injected serum, often a different agar on each side of the paddle. Another reagent solution generally is carried in the jar below.

There have been certain problems with conventional agar closure and paddle assemblies, both in use and in the economy of their manufacture.

These medical test jars often are under vacuum, for example a vacuum of about 5 to 10 inches of mercury. The need for vacuum raises certain issues regarding sealing of the test jar with a screw-on closure, given the objectives of providing a clear, transparent container which will not leak vacuum, and with a means for retaining the agar on the test paddle, to resist falling off the paddle even during jarring in transportation or handling of the test assembly.

The test container itself can advantageously be made of a highly transparent plastic material, OPET (oriented polyethyltetrathiolate), a relatively new material developed for superior oxygen barrier properties.

The oriented PET has a tendency to sink to some degree along one axis by cold flow down the line of the orientation, over a period of time. This tends to occur at two locations on the container finish. As an example, a container with a 53 mm finish opening can sink 0.007 inch over time, at two opposed locations, creating an undulating shape at the top edge of the finish. Such cold flow sagging or sinking makes a greater demand on the integrity of the seal between the closure and the container, particularly with vacuum to be retained. If a one-piece closure is used, with a sealing gasket fixed to its underside, very high level of application torque will be required to form a seal sufficient to maintain a vacuum, which would require unacceptably high torque to remove the closure. The high static friction of the gasket material against the lip or rim of the container finish must be overcome to unscrew and release the gasket from the container. Even though the vacuum inside the container may be reduced or essentially released (by injection of the blood or serum) at the time the closure is to be unscrewed, the need to retain the vacuum and the nature of the OPET as cold flowing with time, will require a very high torque closure.

In addition to this a fixed sealing gasket is normally adhered to the cap by glue. The high level of application torque combined with the high level of frictional resistance on the top of bottle neck finish will tend to twist the gasket material which in turn will have the effect of loosening the cap (back off) caused by the memory of the gasket material. Moreover, unless a rubbery gasket is used, conventional cap lining materials will not be able to provide much of a shelf life and adjust to the anticipated sink in the OPET surface.

A conventional valve seal molded into the one-piece cap also requires a very high level of application torque to form a vacuum tight seal. This will relax somewhat due to cold flow; however, a high level of removal torque is required to unscrew the cap which level is beyond the strength of the average person. In practice it has been found by the applicant that a vacuum can be maintained in this way with an application torque of 40 inch-pounds, but the 35 inch-pounds required to remove it was beyond the average person. Moreover, this method has no compensation for sink in the bottle neck and would undoubtedly lose vacuum over time as this phenomenon occurred.

Under these conditions it is simply beyond the capability of an ordinary, integrally formed valve seal on a relatively hard plastic closure, to retain the vacuum for an appreciable shelf life, such as one year.

Further, the internal vacuum to which the agar on the paddle is subjected tends to cause the agar to shrink somewhat, due to the tendency of the vacuum to remove oxygen (or moisture) from the agar. This causes the agar to shrink away from any retention device included on the paddle, so that retention of the agar becomes more difficult.

At the same time, the agar paddle must be retained very stably to some suitable structure of the closure.

The closure must also provide for injection of the blood or other serum essentially without interrupting the seal of the assembly.

The following U.S. Patents show multiple-piece closures for containers, some having relevance to certain aspects of the invention described below: Miller U.S. Pat. Nos. 3,339,772, Manske 3,736,899, Claasen 3,831,796, Picoy et al. 3,946,891, Wolkonsky 4,493,427, Ryder 4,605,135, Taragna et al. 4,664,276, Grabenkort 4,948,000, Conard 5,080,245, and Schumacher 5,269,429.

None of the above patents discloses a medical test jar having the features described below, nor does any describe a two-piece closure with a closure ring and a connected but freely rotatable separate gasket which enables high-integrity sealing on a container without requiring high torque in closing and opening the container.

SUMMARY OF THE INVENTION

The medical test jar closure of this invention employs a two piece construction as to the retention function and the sealing function of the closure, somewhat similar to a mason jar, but different in that the two pieces are connected together. A pliable but relatively stiff sealing disc or gasket is positioned at the inside surface of a threaded plastic closure ring, connected to the ring but with a vertical clearance and not bonded to the underside of the sealing ring and capable of rotating freely relative to the sealing ring. This in lieu of an integral flange or valve seal as described above, and in lieu of a closure wherein a gasket material is bonded or glued to the closure undersurface. The flexible, rubbery plastic (elastomeric) gasket or disc of the invention is of a material which will slide with relatively low friction against the undersurface of the sealing ring, which preferably is a low-friction surface, such as a polished surface (achieved using a polished mold surface). At the same time, the gasket will engage the container finish with a much higher friction and will remain stationary with the container finish whenever the closure ring is applying pressure.

In screwing the closure onto the container, the gasket disc first rotates along with the threaded ring due to its loose connection to the ring, but after the gasket has been engaged against the rim of the container finish, it remains stationary with the container and the threaded ring rotationally slips on the gasket disc to draw it down tightly and sealing against the container finish. The torque force applied by the user in tightening the closure is thus directed toward pulling the gasket tightly down against the container finish, rather than primarily toward overcoming friction, as would be the case if the gasket were bonded to the threaded lid or closure ring.

Perhaps more importantly, in removing the closure from the container the user need not overcome static friction of the gasket disc with the upper edge of the container finish. The gasket is not bonded to the closure ring and has a relatively low friction engagement with the closure ring, so that the ring slips over the gasket initially, then later the ring lifts the gasket off the container finish due to its connection with the gasket.

In the preferred embodiment described herein, the gasket or disc preferably has an upward extension, generally cylindrical, which passes through an opening at the top of the sealing ring. The upward extension preferably is snapped through this opening, with a small up/down clearance between the two components, so that the components are loosely captured together. The extension has external threads or a snap fit arrangement for a screw-on collar or cap which is a separate piece, relating to the function as a medical test jar. The clearance between the threaded plastic closure ring and the snapped-in gasket disc with the upwardly extending neck piece, helps the user break the seal between the gasket and the container finish by simply lifting the gasket, without having to rotationally overcome static friction load between the gasket and the container finish. When the closure is unscrewed, the closure ring alone rotates first, not affecting the position of the gasket disc. After the friction in the threads has been overcome, the closure ring absorbs the clearance and engages the neck of the gasket disc with an upward force as the closure ring continues to be unscrewed, lifting the gasket disc off the container finish.

The gasket disc preferably is a thermoplastic elastomer material which, unlike traditional cap liners, displaces rather than compresses and will resume its original shape. It is selected to be of a certain hardness, or range of durometer, which is a compromise between competing needs: the need for a high level of friction with the container finish, on the one hand, and the need for rigidity to retain an agar paddle in a preferred embodiment as described below, as well as the need for relatively low friction in the threads which extend above the closure ring are related to the medical test jar function and described further below. In a preferred embodiment, the durometer of this material is between about 70 and 90 on the A scale. The elastomeric material needs to be soft enough to create a vacuum tight seal with the container, but hard enough to allow a threaded outer cap or collar to be screwed on to the elastomer threads and to maintain a sufficient downward load as explained below.

The construction of the agar paddle, which is assembled to and extends down from the closure, is particularly efficient and advantageous in the medical test jar of the invention. First, the paddle is secured to the rubbery gasket disc via a pair of spears which are of a shape which will snap into tapered holes of the gasket disc to provide a secure connection that will retain the paddle stably in a vertical position, without movement. The hardness of the gasket material is important in this regard, since it must be stiff enough to avoid excessive flexure of the paddle while being soft and rubbery enough to assist in a tight snap-in engagement which will not relax or release. The way in which the agar paddle spears or connection posts fit into the elastomeric gasket disc is an important part of the construction of the medical test jar. The paddle must be assembled in such a way that it cannot easily be removed, and the holes in the gasket disc must not be distorted in any way.

The agar paddle, preferably formed of K-resin, a rubber-modified polystyrene, is efficiently produced in such a way as to include posts and a peripheral rim around each side of the paddle. Both the peripheral rims and the posts have considerable undercuts for retaining the gelatin-like agar in place, which may be a different agar on each side. In a preferred construction, the paddle is first molded as generally a transparent plastic frame with a plastic wall carried in the frame, the wall having a series of perpendicular, generally cylindrical posts. A raised perimeter on each side of the paddle has an inward taper on its outer side. After injection molding, the two sides of the paddle are heat-staked in a single step, which produces rivet-like heads on all of the posts and also forms an inward deformation on the perimeter, both of which serve as undercuts for better retention of the agar. This method allows for a continuous uninterrupted lip all around the perimeter of the paddle, which cannot be accomplished by injection molding or any other form of molding. Injection molding of an undercut lip is possible, but only if the corners are left open.

At the open upper end of the generally cylindrical neck piece of the gasket disk, above the sealing ring, a needle-puncturable rubbery stopper (plug) is inserted. This rubbery stopper, preferably made of butyl material, may be held in place and preferably squeezed down somewhat by the threaded or snap-fitted retention cap or collar mentioned above. The retention cap is open-topped with a relatively thin annular flange extending inwardly, and it is preferably tightened onto the upwardly extending neck piece to the extent that the top surface of the rubbery stopper is displaced downwardly, leaving the central portion of the stopper bulging up slightly, eliminating any crevice between the retention cap and the rubbery stopper, which could otherwise trap contaminants.

Finally, another feature of the closure device in a preferred embodiment is the inclusion of an annular outer ring on the gasket disc as an internal seal. The ring depends downwardly and inwardly, shaped similar to a typical valve seal which is often integrally formed on other types of closures. The purpose of this annular rim or flange is to engage the internal diameter and the top edge of the container finish, but not to actually provide the seal. The seal is provided by extensive displacement of the elastomeric gasket material as it is tightened down onto the finish. The internal seal structure, on the other hand, simply engages the top rim and internal diameter of the container finish tightly, with an inclined annular surface of the gasket, so as to prevent blood or other contents of the test jar from entering onto the top rim of the container finish when the test jar is opened. During a medical test procedure, the test jar typically goes through shaking and/or centrifuging, and this internal seal structure prevents any contaminants from being on the top surface of the rim after opening of the test jar.

It is therefore among the objects of the invention to improve the efficiency of manufacture, integrity of construction and integrity in service of a medical test jar of the type which receives a reagent solution, and agar and a needle-injected serum for testing. Another object is to provide a two-piece closure which established a high-integrity seal without requiring excessive torque for opening the container. These and other objects, advantages and features of the invention will be apparent from the following description of a preferred embodiment, considered along with the accompanying drawings in which like-numbered elements in the various drawings are the same.

DESCRIPTION OF PREFERRED EMBDOIMENTS

Figure 1:
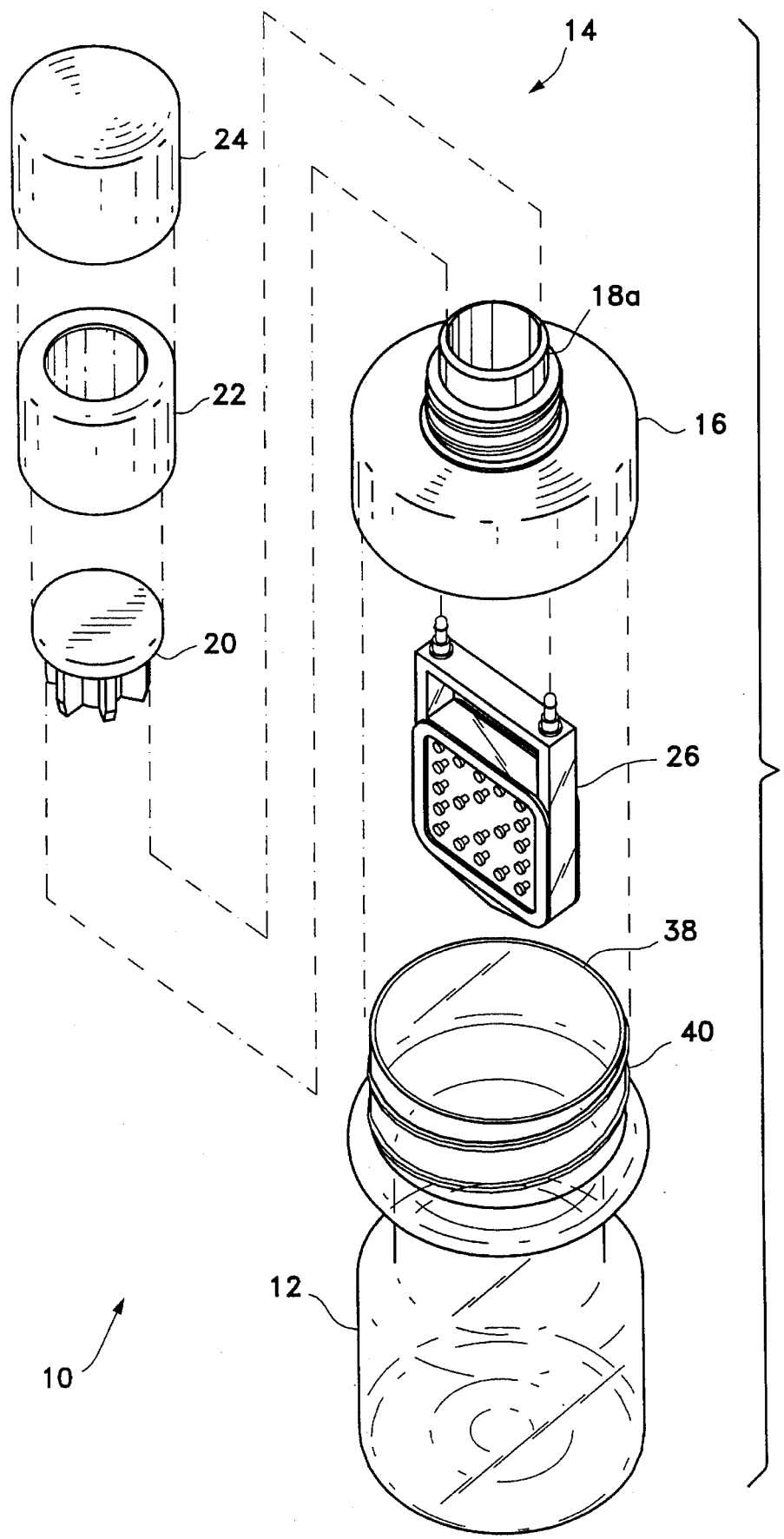
FIG. 1 is an exploded view in perspective showing a container and a closure, including an agar paddle, for assembly onto the container.
Figure 5:
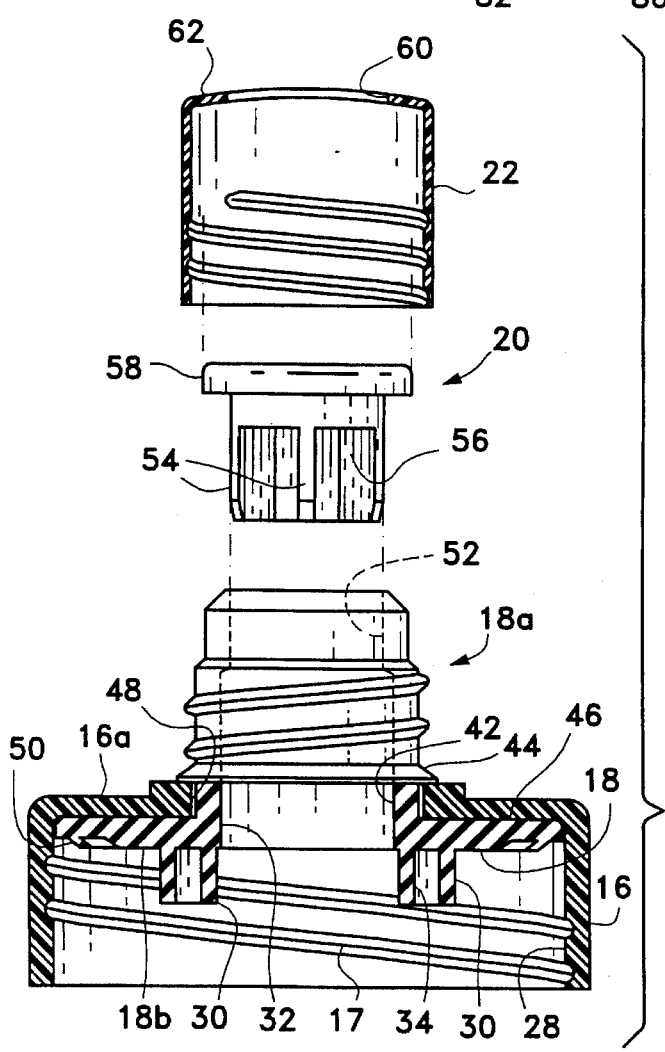
FIG. 5 is a partially exploded sectional view in elevation showing the closure assembly with a gasket/disc member, and also showing a soft rubber stopper which is inserted into a top opening of the gasket/disk, with a retention cap.

FIG. 1 of the drawings shows a medical test jar assembly generally identified by the reference number 10, including a container 12 and a closure assembly identified generally as 14. As shown in FIGS. 1 and 5, within the closure assembly 14 are included a threaded closure ring or skirt element 16 with a thread 17, an elastomeric sealing gasket or gasket disc 18, preferably of a thermoplastic elastomer, positioned beneath and inside the threaded closure ring 16. The gasket disc 18 is just under a horizontal portion 16a of the closure ring 16, and has an upwardly extending neck 18a, with a soft rubbery stopper or plug 20 received in sealed relationship in an upper end opening of the extending neck 18a. A stopper retention cap or collar 22 is provided for assembly over the stopper and the extending neck 18a, and a dust cap 24 is assembled over the retention cap or collar 22 and rubber stopper 20. The assembly also includes an agar paddle 26 retained to the closure, preferably via the elastomeric gasket disc which is inside and against the bottom surface of the horizontal portion 16a of the threaded closure ring 16.

In a preferred embodiment as illustrated, the medical test jar has a container height of about 4 inches and a container finish diameter of about 2 inches, i.e. about 53 mm outer diameter on the container threads. Size is not critical, and in particular the jar could be somewhat smaller, if desired, but the order of magnitude of 4 inch height and 2 inch finish has been found to be a practical one from the standpoint of both manufacturing and use.

As can be seen from FIGS. 1 and 5, the elastomeric gasket or disc 18 is of an outside diameter sized to fit just inside the inner wall 28 of the threaded closure ring 16. The thermoplastic elastomer material from which this gasket disc 18 is preferably formed comprises a thermoplastic with rubber added, and this may be the material Santoprene of Advanced Elastomers, a joint development between Monsanto and Exxon, which uses a polypropylene based plastic. The material may also be a butyl based thermoplastic elastomer, which forms a somewhat improved barrier against carbon dioxide leakage. The material Sarlink, a butyl polypropylene product marketed by DSM Company, can advantageously be used. There are other thermoplastic elastomers (TPEs) which can be alternatives to those described above. TPEs comprise a mixture of thermoplastics and rubbers such as butyl. The use of thermoplastic elastomers or TPEs allows injection molding of rubbery products having a wide range of differing characteristics. As noted above, the thermoplastic elastomer displaces rather than compresses, but has a strong tendency to return to its original shape, and this is beneficial to provide the seal needed in the invention.

Figure 2:
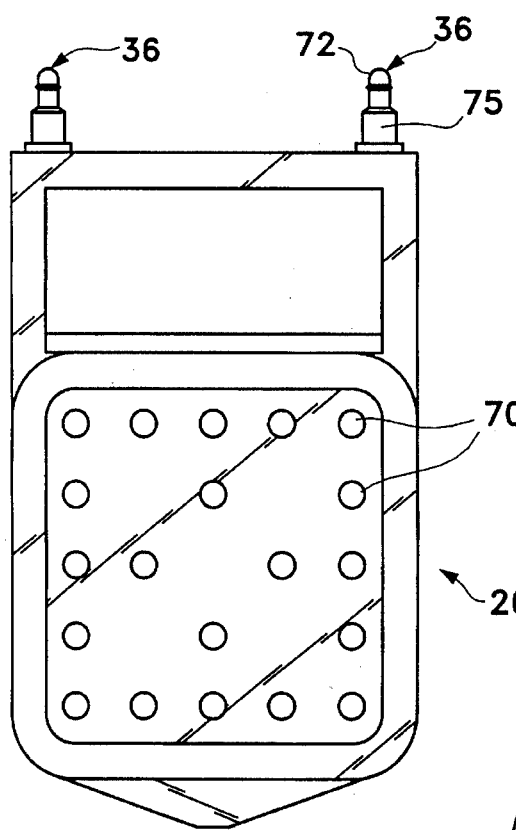
FIG. 2 is a plan view showing the agar paddle and its means of connection to the closure.
Figure 7:
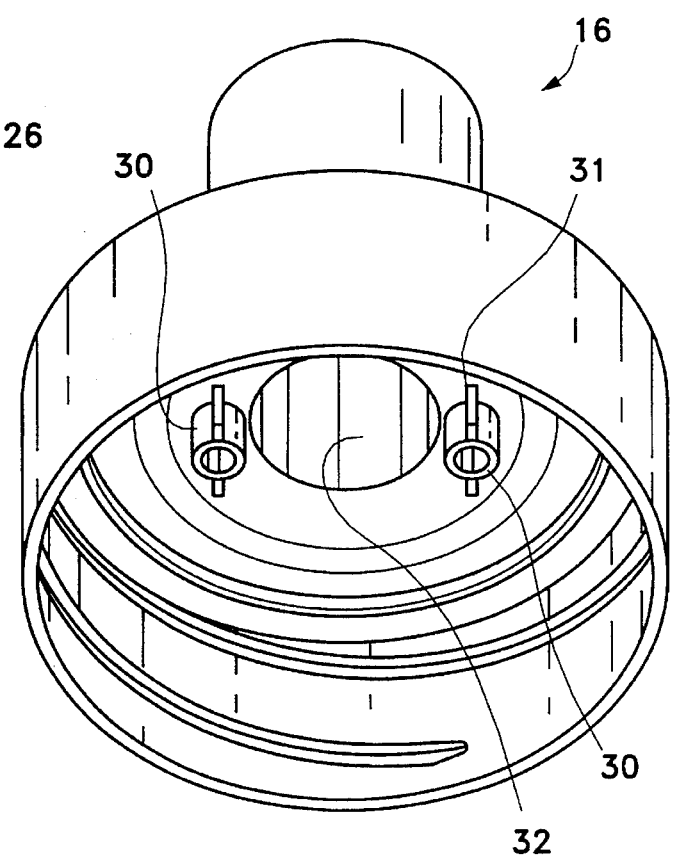
FIG. 7 is a perspective view showing the lower side of the container closure, without the agar paddle.

The gasket disc 18 has a pair of cylindrical studs or bosses 30, integrally formed with the gasket disc and extending downwardly on either side of a central opening 32 of the disk, as best seen in FIG. 5. They may be reinforced with buttressing flanges 31, all part of the integrally molded structure, as seen in FIG. 7. The generally cylindrical studs or bases 30 have central openings or gasket sockets 34, preferably tapered to a tighter diameter deeper within, for receiving a pair of connection spears or posts 36 extending at the upper end of the agar paddle 26 as seen in FIG. 2 and also in FIGS. 3 and 4. To meet this purpose and others, the thermoplastic elastomer gasket disc 18 preferably has a hardness within the range of 70 to 90 on the A scale. This gives sufficient hardness to securely and relatively rigidly retain the agar paddle in the cylindrical bosses 30, and to enable the threaded stopper retention cap or collar 22 to be screwed onto the threaded neck extension 18a of the disc without excessive friction, while also being soft enough to accommodate the snapping in of the agar paddle spears 36 to deform and envelop the spears tightly, and also being sufficiently soft to perform the sealing function of a gasket, against the top edge 38 of the container's finish 40 (FIG. 1). The agar paddle connection posts or spears have a specific construction in the illustrated preferred embodiment, for stable engagement in the gasket sockets 34, described further below.

Further regarding the structure of the gasket disc 18, the disc has a central cylinder 42 forming the opening 32, with an annular ledge or collar 44 positioned as shown in FIG. 5, spaced above the upper surface 46 of the broader diameter portion of the gasket disc. The spacing between these two elements of the gasket disc member 18 is sufficient to provide a slight clearance vertically when the gasket disc member is snapped into the central opening 48 of the threaded ring which may also be called a lid member 16, as shown in FIG. 5, by pushing the ledge or collar 44 through the hole 48. The clearance need not be large; it is preferably less than one millimeter, and more preferably in the range of about 0.2 to 0.8 mm. This clearance is to avoid friction between the threaded ring member and the sealing gasket 18 during relative rotation, to assure that most of the torque of screwing the closure tightly onto the container is used for downwardly forcing/displacing the gasket against the container finish, and also to assure that, on unscrewing of the closure, the torque applied to the threaded ring closure 16 initially needs to overcome essentially only the friction in the threads, and when this has been released and the threaded closure ring 16 has traveled through the clearance, further unscrewing torque is applied to lift the gasket disc 18 via the overhanging collar 44, off the container finish. The separation of these two functions reduces the torque required to remove the closure, eliminating torque which would otherwise be needed to rotationally overcome static friction of the gasket against the container finish. In preferred embodiments the clearance relative to the thread pitch is such as to lift the gasket from the container finish after closure ring 16 rotation of about one-fourth to one-half turn.

FIG. 5 also shows that the gasket disc 18, in a disk-like container sealing portion which resides inside the threaded closure ring 16, has a thickened portion 18b from which the cylindrical bosses 30 extend for connection with the connection spears 36 of the agar paddle 26. Peripheral to this thickened portion 18b is an annular flange 50, integral with the gasket disc 18 and inclined downwardly and inwardly as shown, in the configuration of a valve seal. As explained above, the flange 50 does not function to seal the gasket onto the container finish, which is accomplished by forced displacement of the gasket material, but rather functions to engage against and cover the top rim and engage the internal diameter of the container finish so as to prevent contaminant liquids from splashing onto the top of the container finish and remaining there after the medical test jar is opened. It thus acts as a form of internal seal.

FIG. 5 also shows the injection needle-receiving stopper or plug 20, of a soft rubbery material, to be assembled down into the top opening 52 of the extension neck 18a of the gasket disc. This plug element is advantageously formed of a soft rubbery elastomer such as natural rubber or butyl, and may have a series of radial engaging fingers or ribs 54 extending outwardly from a cylindrical wall 56, which defines a hollow interior. The fingers or ribs 54 have the purpose of allowing vacuum communication into the otherwise closed test jar while the stopper is at a raised position, pushed only about half way down into the opening 52. The stopper is driven home while the assembly is still under vacuum application. The plug or stopper 20 includes a relatively thick (e.g. about ⅛") circular top portion or head 58 which acts as a septum, being puncturable by a needle at or near its center and resealing when the needle is retracted, in the known manner. This allows injection of blood or other serum to be tested into the test jar. As an alternative to butyl rubber, the stopper could be formed of a thermoplastic elastomer having septum properties.

The exploded view of FIG. 5 also shows the plug retention cap or stopper collar 22, to be positioned down over and secured by threads (or, alternatively, a snap-on connection) to the extending neck 18a of the gasket disc. The retention cap 22 has a central opening 60 which, when the cap is assembled, leaves most of the top surface of the plug head 58 exposed. The retention cap or collar 22 may advantageously be formed of high density polyethylene or polypropylene. High density polyethylene (HDPE) has the benefit of being irradiatable, which is needed for sterility in a medical test jar. Also, the threaded stopper collar 22 if formed of high density polyethylene can be stripped from the injection mold, without unscrewing, reducing the cost of the mold.

Figure 6:
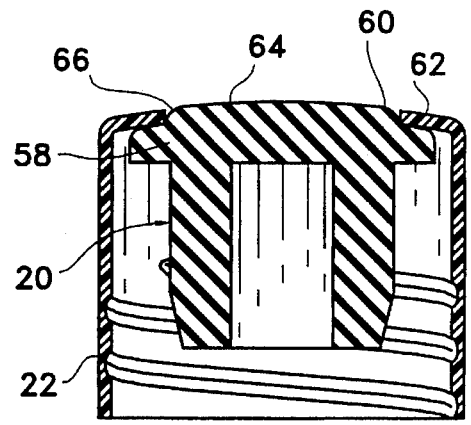
FIG. 6 is a sectional elevation view showing a threaded stopper retention collar as it engages the soft rubber stopper.

As shown in FIGS. 5 and 6, the cap 22 is preferably relatively thin-walled at an annular collar or shoulder 62 which surrounds the opening 60. The collar 62 angles upwardly toward the opening 60. This, as illustrated in FIG. 6, permits the retention cap 22 to push down at the periphery of the plug head 58 to form a bulge or "pooch" 64 where the plug head is exposed after assembly, with the upward/inward angle of the collar 62 assisting this function by displacing the rubber in and up. The bulge in combination with the relatively thin walled construction at the collar 62, assures that virtually no crevice forms at the location 66 in FIG. 6, i.e. where the inner edge of the annular collar 62 meets the plug head. This helps avoid contamination.

As an alternative to the structure shown in FIGS. 1, 5 and 6, with the stopper 20 and stopper collar or cap 22 as separate from the gasket disc 18, in another embodiment the elastomeric gasket disc 18 can be formed to include a septum for penetration by a needle. In such an embodiment the gasket disc structure includes an upper, generally cylindrical extension such as the extension 18a shown in FIGS. 1 and 5, but a septum is formed at the top by a portion of the thermoplastic elastic material bridging across the opening which is shown in FIG. 5. This eliminates the butyl stopper 20 as well as the stopper collar 22; the TPE material needs to be sufficiently soft to provide the puncturable/sealable septum. In another alternative embodiment a separate stopper is included, but a stopper collar or cap similar to the collar 22 would not be screwed onto the disc extension but would be snapped on over an annular bead on the disc extension. Such construction avoids the need for a capper which screws on the stopper collar 22 in the embodiment depicted in FIGS. 1 and 5, and enables the stopper and stopper collar to be driven home together, providing a secure seal while still under vacuum (rather than screwing the stopper collar on later and relying on the stopper alone to temporarily hold vacuum).

Figure 3:
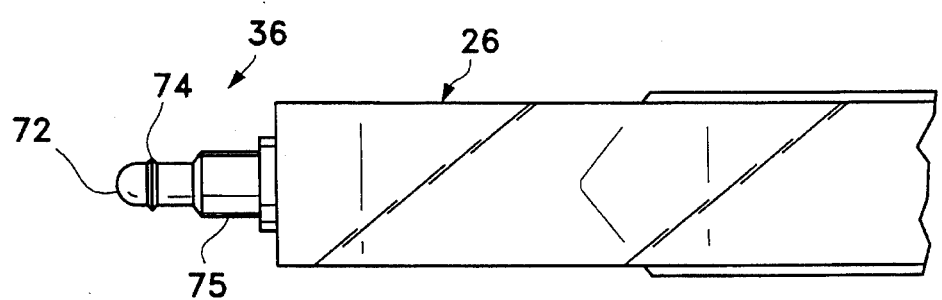
FIG. 3 is a further detail view of the agar paddle.
Figure 4:
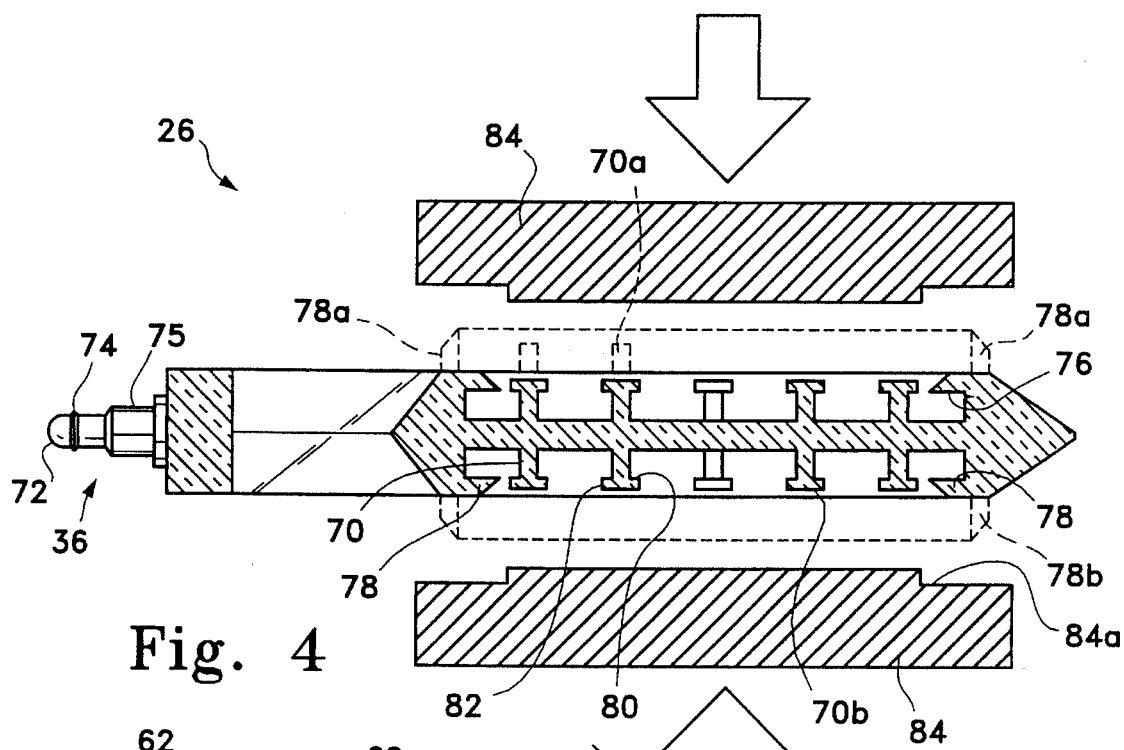
FIG. 4 is a sectional view of the agar paddle, and indicating the staking of the paddle to form undercuts which are effective to retain the flexible agar on the paddle.

FIGS. 2, 3 and 4 illustrate important features of the agar paddle 26. This element is preferably formed by injection molding, of a material which is clear and not brittle and capable of retaining the gel-like agar in place. One preferred material for the agar paddle is rubber-modified polystyrene or K-resin. Polystyrene which does not have added rubber tends to split under stress, which could cause agar retention posts 70 to break off when exposed to shear stress. The rubber-modified polystyrene material is still very clear and highly transparent, but has a slight degree of flexibility and almost no tendency to split or fracture.

As shown in FIGS. 2, 3 and 4, the connection spears 36 on the agar paddle have tapered or rounded ends 72, and an annular interference rim or flange 74 which is fairly sharply defined at its exterior, as indicated. This rim or flange engages tightly into the internally tapered sockets 34 of the TPE studs or bosses 30 depending from the gasket disc 18 as shown in FIG. 5. In addition, a shoulder 75 of larger diameter than the tip area (and larger than the rim 74), as shown in FIGS. 2, 3 and 4, engages into the outer end of the gasket socket 34 to tightly hold the agar paddle in place and prevent sagging. These three structural features, the tapered sockets 34, the barb-like interference rims 74 on the spears and the enlarged shoulders 75 on the spears cooperate to assure a tight, wobble-free connection between the paddle 26 and the gasket disc 18, a connection which will not separate except under a deliberate, rather strong pulling force. The user of the medical test container does not have any way of supporting the agar paddle after it has been filled with the agar, except by holding the closure, so that this connection is very important.

FIG. 4 shows an important feature relative to the production of the agar paddle. The agar paddle 26 is formed with undercuts 76 at a peripheral ledge 78 which extends around the perimeter at both sides of the paddle. Also, further undercuts 80 are included under heads 82 of each of the rivet-like agar retention posts 70. All of these undercut formations, as explained above, assist in receiving the gel-like agar and retaining it in place even if moderate shrinkage occurs under vacuum and over time.

First, the agar paddle 26 is injection molded to form a configuration generally shown with dashed-lined extensions in FIG. 4. The finished configuration could not be formed by injection molding, with the desired undercuts and with the continuous perimeter flange 78 at each side. Thus, after injection molding, the perimeter flanges 78 each extend perpendicularly out from the paddle as indicated at 78a in FIG. 4, with a slight outside bevel angle or taper 78b. Also, the agar retention posts 70 are formed as straight cylinders 70a (dashed lines), albeit with a slight draft for removal from the mold. After this part is formed, all of the posts 70a and the continuous perimeter flanges 78a with their outside angle 78b are heat-staked, in a single operation as indicated in FIG. 4. Heat platens 84 on either side of the piece are brought together to heat stake all of these elements simultaneously, to produce the finished configuration. The perimeter flange stakes inwardly due to the outside angle 78b. As indicated, a small step 84a may be included in the heat platens, to cause the heads 70b of the agar retention posts to be at a slightly recessed plane relative to the finished location of the perimeter flanges 78.

Several preferred materials are discussed above relative to the container 12, the agar paddle 26, the gasket disc 18, the injection-receiving stopper 20 and the plug retention cap or stopper collar 22. In addition, the outer dust cap 24, which merely keeps dust and other airborne contaminants away from the closure assembly during storage or transport, may be made of polypropylene. The threaded closure ring 16, which is used to draw the closure assembly down for sealing, may advantageously be formed of irradiatable polypropylene. The irradiatable polypropylene is generally good for about seven megarads, for two irradiations of the test jar assembly. One suitable irradiatable polypropylene may be the product produced by Eastman Chemical Company.

The preferred embodiment described above includes a two-piece closure construction which enables a high-integrity seal with a plastic container, even if the container is formed of a material which is subject to sinking or cold flowing. The principle of the two-piece closure, with the gasket component and the closure ring connected together but rotatable relative to each other and with a clearance between them, facilitates the low-torque withdrawal of the closure without the user's having to overcome static friction load of a gasket against a container finish. The invention encompasses this broader principle, in addition to the more specific features of the medical test jar embodiment which is described.

The above described preferred embodiments are intended to illustrate the principles of the invention but without limiting its scope. Other embodiments and variations to these preferred embodiments will be apparent to those skilled in the art and may be made without departing from the essence and scope of the invention as defined in the claims.

I claim:

1. A medical test jar for holding an agar and a reagent solution and for receiving liquid samples to be tested, comprising:
   a container capable of holding vacuum, and having a threaded container finish at an upper end,
   a closure adapted to fit together in sealed relationship with the container, the closure including:
   (a) a closure ring with a generally horizontal portion and with threads complementary to the threaded finish of the container such that the closure ring can be screwed down onto the container,
   (b) a sealing gasket positioned against the underside of the generally horizontal portion of the closure ring in position to engage the upper edge of the container finish, not secured fast to the closure ring and capable of slipping relative to the closure ring when the closure ring is screwed onto the container,
   (c) an opening in the closure ring surrounded by said generally horizontal portion, with a generally cylindrical extension of the sealing gasket extending up through the opening,
   (d) puncturable injection receiving means associated with the generally cylindrical extension having a needle puncturable septum which is normally closed so as to hold a vacuum in the container but which permits a needle to be inserted to inject liquid into the interior of the container, and
   (e) an agar paddle and means securing the agar paddle to the interior side of the closure.

2. The medical test jar of claim 1, wherein the means securing the agar paddle comprises connection means on an inside surface of the sealing gasket for receiving cooperating connection means on the agar paddle such that the agar paddle snaps together with the sealing gasket to hold the agar paddle in a generally vertical depending position for extension into the container.

3. The medical test jar of claim 2, wherein the connection means on the sealing gasket comprises at least two sockets formed integrally on the sealing gasket, tapering inwardly to smaller diameter, and the cooperating connection means comprises at least two spears on the agar paddle, with barb means on the spears for tightly engaging the spears in the sockets when forced into the sockets, and further including an enlarged shoulder at a base end of each spear, spaced from the barb means and sized to fit tightly in an interference fit with the socket.

4. The medical test jar of claim 1, wherein the puncturable injection receiving means comprises an elastomeric stopper fitted sealingly into an opening at the upper end of the generally cylindrical extension of the sealing gasket, the stopper having said needle puncturable septum.

5. The medical test jar of claim 4, further including a threaded stopper retention cap for holding the stopper securely and sealingly within the generally cylindrical extension, the cylindrical extension having external threads and the threaded stopper retention cap being generally cylindrical with internal threads and with an annular internally extending flange at its upper end for engaging downwardly against the stopper when the retaining collar is screwed down onto the generally cylindrical extension.

6. The medical test jar of claim 1, wherein the sealing gasket comprises a thermoplastic elastomer material, having a hardness durometer between about 70 and 90 on the A-scale.

7. The medical test jar of claim 6, wherein the sealing gasket further includes a valve seal comprising an annular ring flange positioned to engage the top and internal diameter of the container finish when the closure is screwed down onto the container, to keep liquids from the container off the top edge even when the medical test jar is opened.

8. The medical test jar of claim 1, wherein the container is formed of oriented PET.

9. The medical test jar of claim 1, wherein the sealing gasket is of such flexibility and its contact with the top of the container finish is such that the closure may be tightened down onto the container to retain a vacuum of at least 5 to 15 inches of mercury while requiring an unscrewing torque of no more than 25 inch-pounds.

10. A medical test jar comprising in combination:
    a substantially transparent container of plastic material, said plastic material being gas-impermeable and capable of retaining a vacuum of about 5 to 15 inches of mercury, and having a finish with a thread, and a container closure including, (a) a threaded lid member having a thread positioned to engage with the corresponding thread on the finish of the container, (b) gasket means at the underside of the lid member, separate from and not bonded to the lid member so as to be rotationally separate from the lid member, for engaging sealingly with the top of the container finish when the lid member is screwed onto the container, (c) the gasket means including connection means for receiving an agar paddle so as to connect directly to the agar paddle and to suspend the agar paddle down into the container, (d) serum receiving means associated with the container closure for receiving injection of a serum via a needle to react with contents of the container when the container is closed, and (e) an agar paddle with paddle connection means for interacting with the connection means of the gasket means, to secure the agar paddle in a substantially vertical position to depend downwardly from the container closure and into the container.

11. The medical test jar of claim 10, wherein the lid member has a central opening and the gasket means is assembled through the central opening, with a container sealing portion of the gasket means at the inside of the lid member, and a generally cylindrical extension passing up through the central opening of the lid member, said serum receiving means closing the generally cylindrical portion of the gasket means.

12. The medical test jar of claim 11, wherein the serum receiving means comprises an elastomeric stopper assembled into an open upper end of the generally cylindrical extension of the gasket means, penetrable by a needle for injection of the serum.

13. The medical test jar of claim 12, further including an external thread on the generally cylindrical extension of the gasket means exposed above the lid member, and an internally threaded stopper retention cap having threads engageable with the externally threaded generally cylindrical extension and having an opening at its top surrounded by an annular collar, said internally threaded stopper retention cap being engageable onto the generally cylindrical extension to retain the elastomeric stopper tightly down in the generally cylindrical extension.

14. The medical test jar of claim 13, wherein the elastomeric stopper is soft and rubbery and the annular collar on the stopper retention cap is relatively thinwalled, such that when the stopper retention cap is tightly installed down against the stopper, the elastomeric stopper displaces and bulges or pooches upwardly interior of the annular collar, substantially eliminating any crevice at the inner edge of the annular collar of the stopper retention cap.

15. The medical test jar of claim 14, wherein the annular collar is angled upwardly toward the opening at the top of the retention cap, aiding in the displacement of the elastomeric stopper.

16. The medical test jar of claim 13, wherein the gasket means is formed of a thermoplastic elastomer material.

17. The medical test jar of claim 16, wherein the thermoplastic elastomer gasket means has a hardness of about 70 to 90 durometer on the A-scale.

18. The medical test jar of claim 10, wherein the container is formed of oriented PET.

19. The medical test jar of claim 10, wherein the agar paddle includes a series of rivet-headed agar retention posts with undercuts to help retain the agar mass.

20. The medical test jar of claim 19, wherein the agar paddle further includes a continuous perimeter flange on each side, overhanging the paddle inwardly so as to form an undercut under the perimeter flange to help retain the agar mass.

21. A method for forming an agar paddle for a medical test jar, the agar paddle serving to support an agar mass which holds a culture medium to be used in a test in the medical test jar, comprising the steps of:

molding the agar paddle in an unfinished condition, including forming a connection means for securing the agar paddle to the medical test jar and including forming a frame-like portion integral with the connection means and comprising a web or plate having a series of posts extending from the plate and a perimeter flange around the plate and the posts, the posts being generally cylindrical and the perimeter flange being continuous around the perimeter and both the posts and perimeter flange extending outwardly from the plate generally perpendicular to the plate, and staking the posts and the perimeter flange simultaneously, using heat and pressure delivered with a platen having a surface parallel to the web or plate and pushing against the perimeter flange and outer ends of the posts so as to deform the perimeter flange inwardly, toward the posts and down toward the plate to form an inwardly overhanging, undercut ledge over the plate at its perimeter and so as to form rivet-like heads on the posts thus forming further undercuts between the rivet-like heads and the plate, such undercuts helping to retain an agar mass.

22. The method according to claim 21, wherein the frame-like portion of the agar paddle is two-sided, with two substantially identical and opposite sides each with a perimeter flange and a series of posts, extending in opposite directions from the plate such that agar can be retained on both sides of the agar paddle, with the method including applying heat and pressure with two platens which converge toward the unfinished agar paddle from opposite directions.

23. The method according to claim 22, wherein the unfinished agar paddle is formed by injection molding of K-resin, a rubber-modified polystyrene.

24. A container and closure combination, comprising:

a container having a threaded finish near an upper end, a closure adapted to fit together in sealed relationship with the container, the closure including (a) a closure ring with a generally horizontal portion and with threads complementary to the threaded finish of the container such that the closure ring can be screwed down onto the container, (b) a sealing gasket positioned below the underside of the generally horizontal portion of the closure ring in position to engage the upper edge of the container finish, not secured fast to the closure ring and capable of slipping relative to the closure ring when the closure ring is screwed onto the container, (c) the closure ring having engagement means on a lower side of said generally horizontal portion, above the sealing gasket, for engaging downwardly against the sealing gasket when the closure ring is screwed down onto the container in a relatively low-friction engagement, which is lower in friction than that between the sealing gasket and the upper edge of the container finish, and (d) connection means between the closure ring and the sealing gasket, for retaining the sealing gasket with the closure ring while also providing a vertical clearance between the closure ring and the sealing gasket such that the closure ring engages downwardly against the sealing gasket when the closure ring is screwed downwardly on the container and lifts upwardly on the sealing gasket when the closure ring is unscrewed upwardly, the vertical clearance providing that for a portion of its rotational and vertical travel in screwing onto the container and unscrewing from the container the closure ring rotates independently of the sealing gasket, the connection means between the closure ring and the sealing gasket comprising a central opening in the generally horizontal portion of the closure ring, and the sealing gasket including an upwardly extending portion extending up through the opening in the closure ring and having an annular collar extending radially outwardly and spaced vertically above the generally horizontal portion, the annular flange being snapped through the opening in the closure ring and there being a sufficient vertical distance between the annular collar and the generally horizontal portion as to establish said vertical clearance, whereby the closure ring may be screwed onto the container to press the sealing gasket down against the upper edge of the container finish to tightly and sealingly engage the sealing gasket against the container finish without rotation of the sealing gasket on the container finish, the closure ring slipping rotationally relative to the sealing gasket as the closure ring is tightened down in engagement with the sealing gasket, and whereby; upon opening of the closure, initial unscrewing rotation of the closure ring is accomplished with the closure ring slipping relative to the sealing gasket which initially remains stationary on the container finish as the closure ring rises through the vertical clearance, then the sealing gasket is engaged upwardly by the closure ring and is lifted upwardly off the container finish by the closure ring as the closure ring is further unscrewed upwardly, thus enabling the closure to be removed without having to rotationally overcome static friction of the gasket with the container finish.

25. A container and closure combination, comprising:

a container having a threaded finish near an upper end, a closure adapted to fit together in sealed relationship with the container, the closure including (a) a closure ring with a generally horizontal portion and with a depending flange having threads complementary to the threaded finish of the container such that the closure ring can be screwed down onto the container, (b) a sealing gasket positioned below the underside of the generally horizontal portion of the closure ring in position to engage the upper edge of the container finish, not secured fast to the closure ring and capable of slipping relative to the closure ring when the closure ring is screwed onto the container, (c) the closure ring having low-friction engagement means on a lower side of said generally horizontal portion, above the sealing gasket, for engaging downwardly against the sealing gasket when the closure ring is screwed onto the container in an engagement which is lower in friction than friction between the sealing gasket and the upper edge of the container finish, and (d) annular gasket engagement means on the closure ring for engaging downwardly against the sealing gasket when the closure ring is screwed downwardly and for lifting upwardly on the sealing gasket when the closure ring is unscrewed upwardly, and the annular gasket engagement means including means providing a vertical clearance between the annular gasket engagement means and the sealing gasket such that for a portion of its rotational and vertical travel in both directions the closure ring rotates independently of the sealing gasket, whereby, when the closure ring is screwed onto the container the sealing gasket remains stationary with the container finish as the closure ring is tightened, and whereby, upon opening of the closure, during initial unscrewing rotation of the closure ring the sealing gasket remains stationary with the container finish, so that tightening and unscrewing of the closure ring do not require overcoming friction of the sealing gasket relative to the container finish.

* * * * *